US005204293A

United States Patent [19]
Amundson, Jr. et al.

[11] Patent Number: 5,204,293
[45] Date of Patent: Apr. 20, 1993

[54] BURGUNDY COLORED GLASSWARE

[75] Inventors: W. Duane Amundson, Jr., Corning; Robert M. Morena, Lindley, both of N.Y.

[73] Assignee: Corning Incorporated, Corning, N.Y.

[21] Appl. No.: 749,121

[22] Filed: Aug. 23, 1991

[51] Int. Cl.$^5$ .................. C03C 3/078; C03C 3/087
[52] U.S. Cl. ........................ 501/72; 501/70; 501/71
[58] Field of Search ............... 501/70, 72, 71

[56] References Cited

U.S. PATENT DOCUMENTS

| 29,020 | 7/1860 | Tromull | 501/72 |
|---|---|---|---|
| 113,124 | 3/1871 | Willson | 501/71 X |
| 1,615,448 | 7/1925 | Frank | 501/70 |
| 3,351,475 | 11/1967 | Hagedorn | 501/71 |
| 3,561,985 | 2/1971 | Hagedorn | 501/70 X |
| 4,116,704 | 9/1978 | Boyd et al. | 501/66 |
| 4,235,634 | 11/1980 | Boyd et al. | 501/70 |

FOREIGN PATENT DOCUMENTS

| 0250400 | 8/1969 | U.S.S.R. | 501/70 |
|---|---|---|---|
| 1160941 | 8/1969 | United Kingdom | 501/70 |

*Primary Examiner*—Karl Group
*Attorney, Agent, or Firm*—Milton M. Peterson; Clinton S. Janes, Jr.

[57] ABSTRACT

A transparent glass exhibiting a burgundy color, and glassware molded therefrom, the glass consisting essentially of 0.3 to 2.2% by weight of manganese oxide, calculated as $MnO_2$, in a soda lime silicate base glass, exhibiting chromaticity coordinates (Illuminant C) falling within the ranges
  x=0.3200 to 0.3700
  y=0.3300 to 0.3080
  Cap Y=25 to 72 and having impurity levels for NiO and $Fe_2O_3$ not exceeding 100 ppm and 500 ppm, respectively.

17 Claims, 4 Drawing Sheets

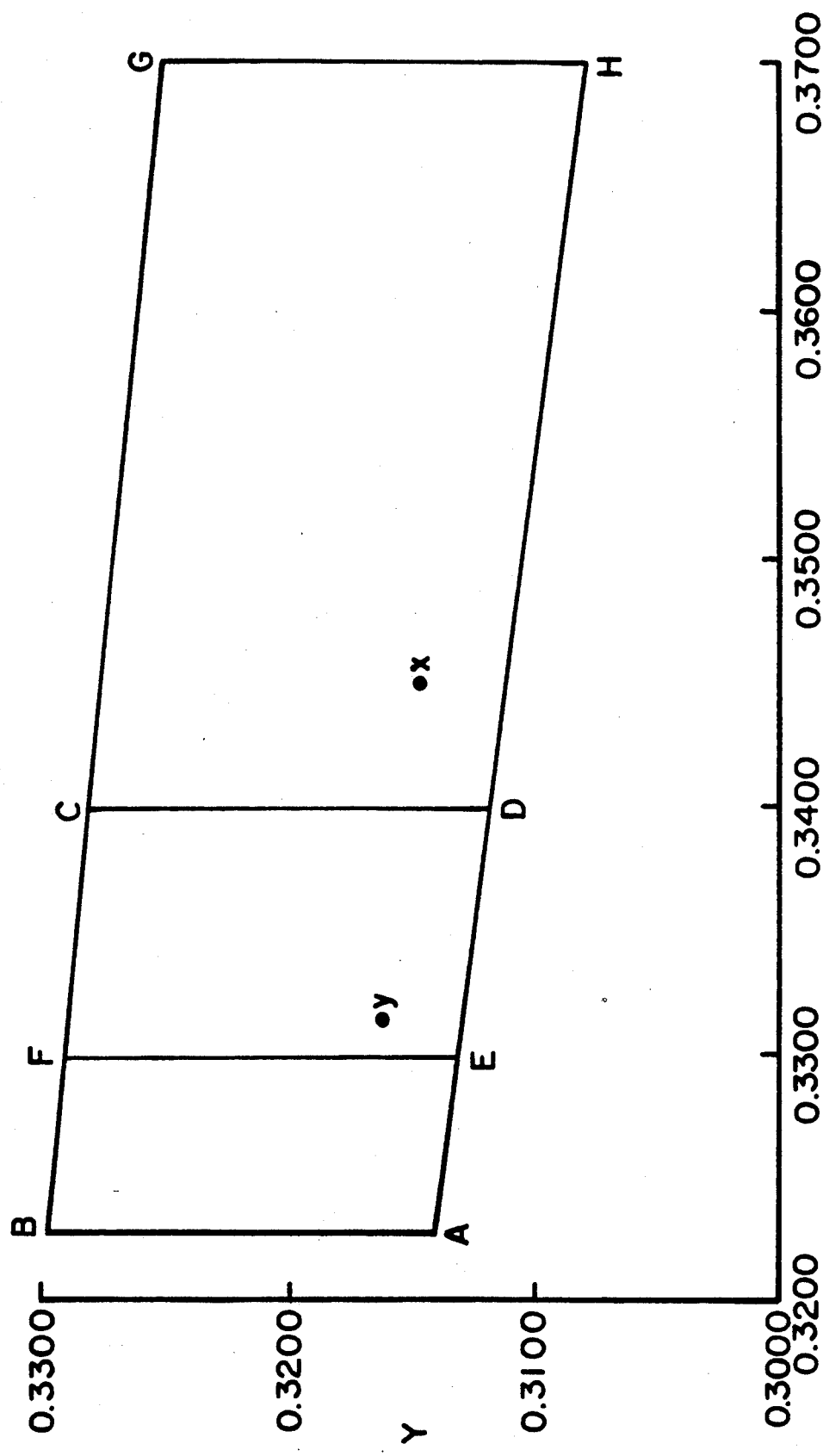

BURGUNDY COLORED GLASSWARE

FIELD OF THE INVENTION

The field is transparent, colored, soda lime glasses and glassware produced therefrom.

BACKGROUND OF THE INVENTION

Traditionally, cookware was produced from metals such as iron and aluminum. The development of glass-ceramic materials offered an alternative. Thus, since about 1960, opaque, glass-ceramic cookware has been available from Corning Glass Works (now Corning Incorporated) under the trademark CORNING WARE. More recently, a transparent glass-ceramic with a light brown tint has been available from the same source under the trademark VISIONS.

Glass bakingware, or ovenware, has an even longer history, having been introduced about 1915 under the mark PYREX. This bakingware was originally molded from a clear, water white, borosilicate glass. Subsequently, the desire for color became apparent. That led to opal ware that could be decorated either with a solid color or with a pattern.

Recently, a transparent glass product with a brown tint was introduced under the mark FIRESIDE. The glass in that ware is described in U.S. Pat. No. 4,116,704. It has a clear, borosilicate base with a color package consisting of cobalt, nickel and manganese oxides.

All of these products have proven eminently successful. However, the need for further cosmetic change has been perceived from consumer surveys. Accordingly, a variety of colors have been consumer tested. These studies have indicated a preference for transparent cookware having a rose or burgundy tint.

The findings led to development of glass-ceramic cookware having a burgundy tint. This ware is described in a companion application, Ser. No. 753,316, entitled Colored Glass-Ceramic, filed of even date herewith by B. G. Aitken et al., and assigned to the same assignee as the present application.

The development of burgundy tinted cookware led to the need for coordinated glassware. In particular, coordinated glass covers were needed for the glass-ceramic cookware. It is a basic purpose of this invention to supply this need. Another purpose is to provide ovenware having a burgundy color.

SUMMARY OF THE INVENTION

One aspect of our invention resides in a transparent glass exhibiting a burgundy color, the glass consisting essentially of 0.3 to 2.2% by weight manganese oxide, calculated as $MnO_2$, in a soda lime silicate base glass, exhibiting chromaticity coordinates (Illuminant C) falling within the ranges x=0.3200 to 0.3700
y=0.3300 to 0.3080
Cap Y=25 to 72 and having impurity levels for NiO and $Fe_2O_3$ not exceeding 100 ppm and 500 ppm, respectively. In one preferred embodiment, the glass contains $Sb_2O_3$ as a fining agent and the manganese oxide content is in the range of 1.0–1.6% with the x coordinate being 0.3225 to 0.3400 and the y coordinate being 0.3295 to 0.3118. In another embodiment, NiO, if present, does not exceed 50 ppm.

In another aspect, the invention resides in an article of glassware composed of soda lime silicate base glasses having color package compositions and characteristics as recited above and having a burgundy color. In one preferred embodiment the glass article is a cover for a glass-ceramic cooking vessel that has a burgundy color coordinated with a burgundy color in the cooking vessel. In another, it is a glass dish having a darker color.

PRIOR ART

The history of color in glassware rivals the history of glassware itself. The subject is treated extensively by Woldemar A. Weyl in his well-known text *Coloured Glasses* published by Dawsons of Pall Mall, London, England (1951). In Chapter 7 of his text, Weyl states that "(b)esides being a colouring agent, it (manganese) plays an important role as decolourizer, for it oxidizes iron, and also by its own colour, compensates for the green colour which iron produces in the glass." Subsequently, Weyl refers to the well-known purple colour, which he ascribes to the trivalent state ($Mn^{+3}$) with the divalent state ($Mn^{+2}$) yielding a yellow or brown color.

Among United States Patents disclosing use of manganese oxide are:

U.S. Pat. No. 29,020 (Trumbull) discloses the decolorizing effect in an iron-containing glass.

U.S. Pat. No. 113,124 (Willson) mixes equal parts of manganese and chromium oxides in a lens glass to produce a pink color.

U.S. Pat. No. 1,615,448 (Frank) combines manganese and ferric oxides to provide a colorless, ultra-violet absorbing glass, while U.S. Pat. No. 1,779,176 (Long) uses a glass containing manganese under reducing conditions to reduce iron and thus provide ultra-violet transmission.

U.S. Pat. No. 3,351,475 (Hagedorn et al.) employs $MnO_2$, with or without CaO, to avoid "browning" in glass subjected to sterilizing radiation.

U.S. Pat. No. 3,561,985 (Hagedorn et al.) discloses a sodium borate frit containing MnO which may be included as a forehearth addition to a soda lime glass to produce a light orange color.

U.S. Pat. No. 4,235,634 (Boyd et al.) employs a combination of NiO and $MnO_2$ to produce an amber color with rose highlights in a tempered soda lime glass.

BRIEF DESCRIPTION OF THE DRAWINGS

FIG. 4 is a graphical representation in which x and y color coordinates are plotted to provide overlapping rectangles representing different embodiments of the invention.

DESCRIPTION OF THE INVENTION

Figure 1:
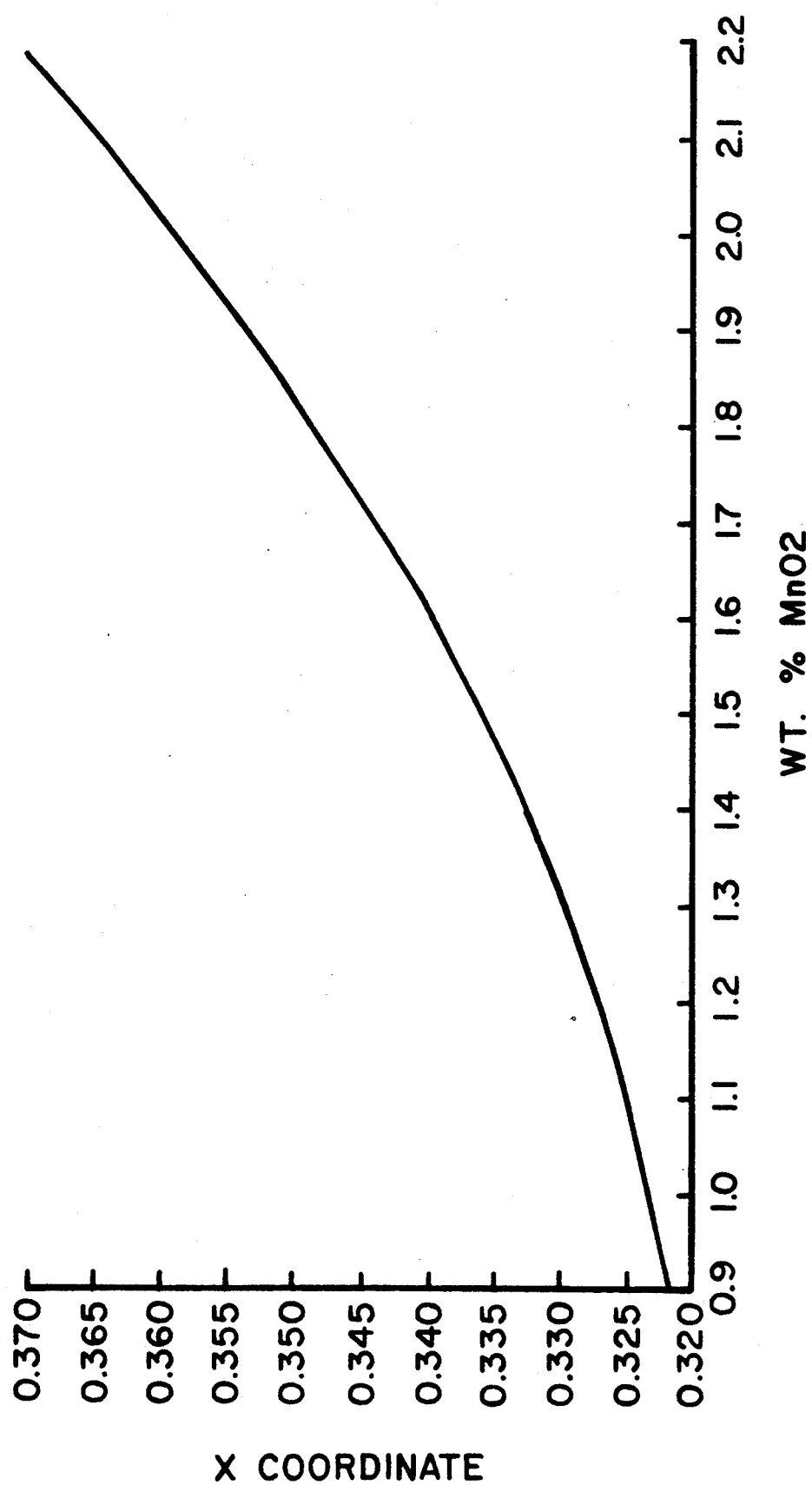
FIG. 1 is a graphical representation of the variation of the x color coordinate with manganese oxide content.

A key feature of the present invention is the use of manganese oxide, together with the exclusion, or controlled limitation, of other potential colorants, to obtain a clear, transparent burgundy color in soda lime silicate glassware. For this purpose, manganese oxide exists in both the manganic ($Mn^{+3}$) and manganous ($Mn^{+2}$) forms, as explained in more detail later. However, it is customarily batched as $MnO_2$, and is also reported in this form in analyses. Accordingly, custom is followed and the oxide is referred to as $MnO_2$.

The glasses of the present invention were developed to provide a glass cover for a glass-ceramic cooking vessel as described in companion application Ser. No. 753,316 identified above. Therefore, the invention is generally described with reference to such cover. However, it will be appreciated that other articles may be produced, in particular, ovenware items having a burgundy color.

The glass-ceramic material of the companion application is transparent and has a beta-quartz solid solution as its primary crystal phase. It has good infra-red transmission and has a color package composed of 50–150 parts per million (ppm) $Co_3O_4$ and 50–250 ppm NiO in conjunction with 450–1000 ppm $Fe_2O_3$ and up to 4% $TiO_2$ as a nucleating agent. Thereby, the glass-ceramic exhibits a burgundy color.

It is well-known in the glass-ceramic art that colorants behave differently in a glass-ceramic than they do in even the precursor glass. Therefore, to even approximate a color match, it becomes necessary to use different colorants in a glass-ceramic and in a glass. Consequently, because different colorants must be used, and because of the inherent difference in the materials themselves, an exact color match between a glass cover and a glass-ceramic cooking vessel is generally not possible. Rather than using the term "matching", which suggests identity, the term "coordinating" is used in this application, and indicates a close visual similarity.

Visual appearance of a color is, of course, controlling from the consumer viewpoint. The tint thus selected must then be defined for production control. For this purpose, the standard CIE system, employing chromaticity coordinates x and y and the tri-stimulus value Cap Y, has been adopted. Chromaticity values are measured under standard conditions, i.e., Illuminant C, with a Hunter Colorimeter. They are a measure of light that diffusely reflects off opaque surfaces. Because the values obtained are readily reproducible, they are commonly employed to facilitate comparisons and to establish specification limits.

Arsenic and/or antimony oxides are customarily used as fining agents in glass melting. Recently, efforts have been made to avoid the use of arsenic. Accordingly, up to 0.1% $Sb_2O_3$, optionally supplemented by sulfate, is used as a fining agent in the present glasses. It will be understood that the invention is described with reference to that embodiment unless otherwise indicated.

However, the possibility exists that further environmental findings might also limit the use of antimony in the future. Because of that potential, studies were made to determine the effect of omitting this oxide.

To our surprise, a lesser amount of manganese oxide was required to provide an equivalent color in an antimony-free composition. For example, it is necessary to use 1.0 to 1.6% $MnO_2$ in an $Sb_2O_3$-fined glass to obtain the light burgundy color desired in a glass cover for a cooking vessel. However, similar light colors are obtained with 0.3 to 0.8% $MnO_2$ in an antimony-free glass. With equal amounts of $MnO_2$ added, an antimony-free glass has a darker color. However, the hue appears unchanged.

It is our belief that this difference occurs because antimony oxide performs a dual role in a glass. Its function as a fining agent is generally ascribed to thermal evolution of oxygen with the antimony oxide being reduced to a lower state of oxidation. We believe that antimony oxide affects manganese oxide in a reverse manner. In other words, manganese oxide is reduced from the trivalent manganic form to the divalent manganous form.

This means that, in the presence of antimony oxide, more manganese oxide must be present to provide the same amount of manganic oxide colorant, and hence the same depth of color. Conversely, in the absence of antimony oxide, the reduction of manganese oxide does not occur to any great extent. Hence, less of the manganese oxide is required for the same color. Nevertheless, in view of long experience with antimony oxide fining in commercial melting, it is currently preferred to employ this oxide in our glasses.

In the accompanying drawing, FIG. 1 is a graphical representation wherein x color coordinate values are plotted against $MnO_2$ content in a soda lime silicate glass. The x values, as measured with Illuminant C in accordance with the CIE color coordinate system, are plotted on the vertical axis. The $MnO_2$ contents in the glass batches are plotted on the horizontal axis. The smooth curve in the graph is drawn through points plotted from data measured on glass samples containing varying amounts of $MnO_2$.

Figure 2:
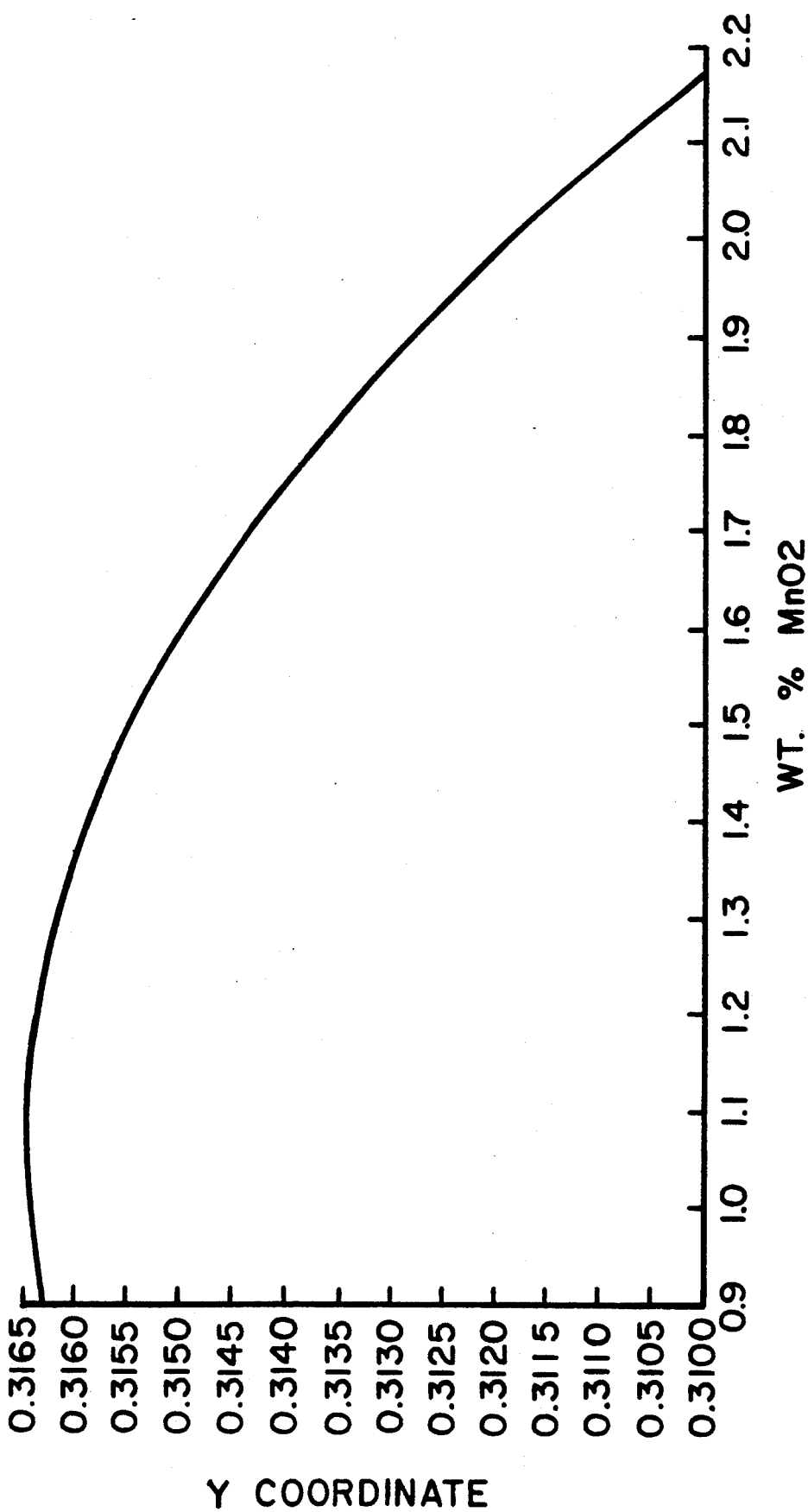
FIG. 2 is a graphical representation of the variation of the y color coordinate with manganese oxide content.

FIG. 2 is a similar graphical representation showing corresponding y coordinates plotted against $MnO_2$ in a soda lime silicate glass. Again, the y coordinates are plotted on the vertical axis and $MnO_2$ content on the horizontal axis.

Figure 3:
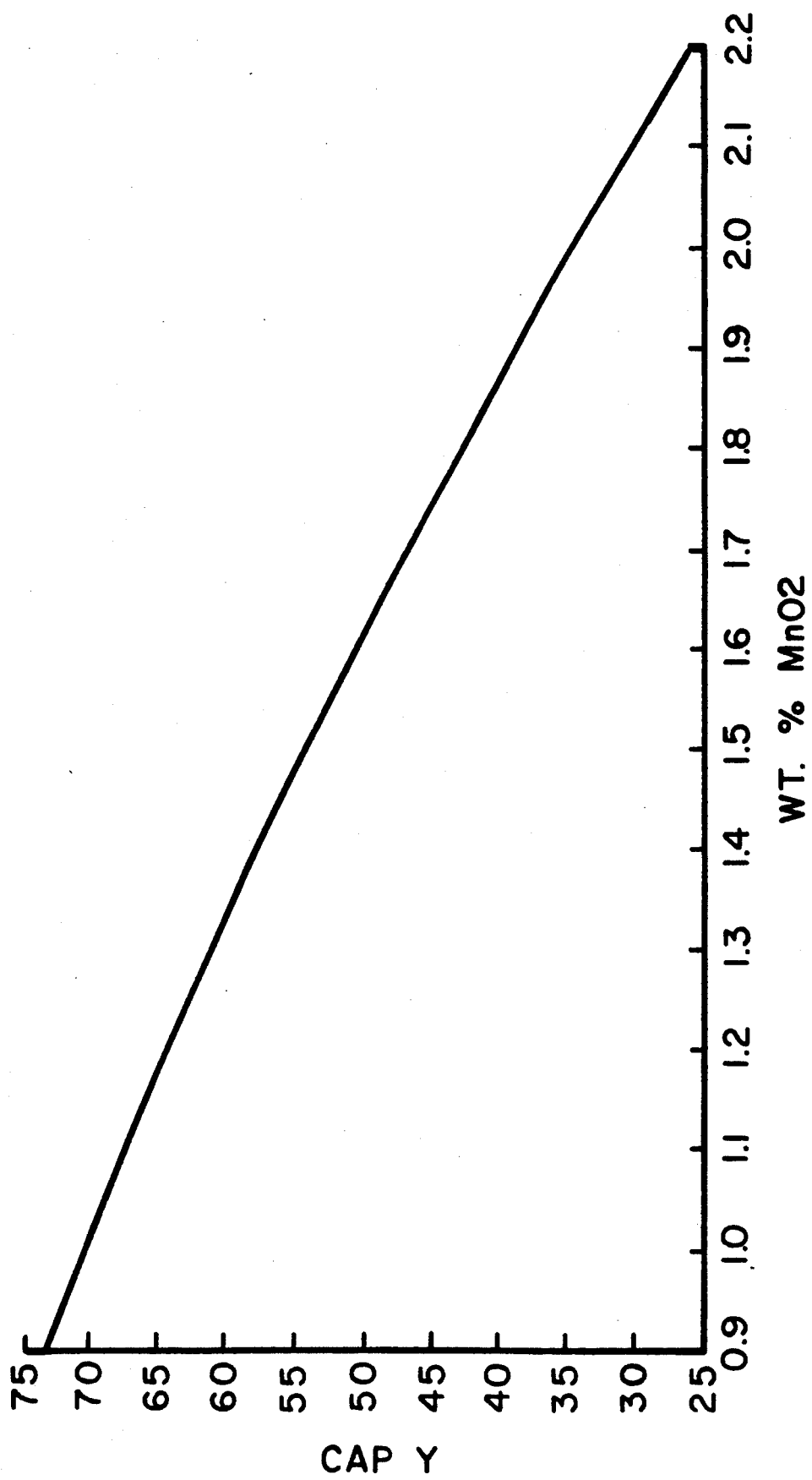
FIG. 3 is a graphical representation of the variation of the Y tristimulus (Cap Y) values with manganese oxide content.

FIG. 3 is a graphical representation corresponding to FIGS. 1 and 2, but showing Cap Y tristimulus values similarly plotted against $MnO_2$ contents.

FIG. 4 is a further graphical representation wherein x coordinates are plotted on the horizontal axis and y coordinates on the vertical axis. The rectangle ABCDA encompasses coordinate values that represent the target area for a suitable burgundy color to coordinate with the burgundy color in the beta-quartz solid solution glass-ceramic cookware of application Ser. No. 753,316. x and y coordinate values for this preferred area are:

x=0.3225 to 0.3400
y=0.3295 to 0.3118

Colors represented by rectangle ABCDA are generally on the light side. Such light shades are considered more desirable for the cookware cover where the cooking vessel should predominate. However, where a dish is viewed alone, as in the case of ovenware, darker colors are considered more desirable. Such darker colors fall within overlapping rectangle EFGHE. The x and y coordinate ranges here are:

x=0.3300 to 0.3700
y=0.3280 to 0.3080

In general, glasses having x and y coordinates within rectangle ABCDA will contain 1.0–1.6% $MnO_2$. Likewise, glasses having coordinates within EFGHE will contain 1.35 to 2.2% $MnO_2$. The intensity of the burgundy color increases with $MnO_2$ content. Therefore, contents in the range of 1.0–1.6% $MnO_2$ tend to be light, while those in the range of 1.6–2.2% tend to be darker. However, the hue is not appreciably changed.

As indicated earlier, the foregoing discussion of the drawings and $MnO_2$ ranges relates to base glasses employing up to 0.1% $Sb_2O_3$ as a fining agent. In antimony-free glasses, the rectangular, chromaticity coordinate target area simply extends further to the left. Thus, the spread between the maximum and minimum y coordinates in FIG. 4 will remain about the same, but actual values will increase as the x coordinate values move to lower numbers.

The net effect will be that the lighter colors desired for a glass cover will be obtained with 0.3 to 0.8% by weight $MnO_2$ addition to the glass batch. By the same token, darker colors, as desired for individual dishes, will be obtained with 0.7 to 1.4% $MnO_2$ in an antimony-free glass.

The desired color may be obtained in reasonably pure form, that is, not visually gray or muddy. However, care should be taken to avoid other potential colorants, or at least keep them within reasonable limits. Particular attention must be given to nickel oxide, since it is commonly used as a colorant. Amounts greater than 100 ppm NiO must be avoided since they lead to a brown color. Preferably, the NiO level is maintained below 50 ppm.

Iron oxide is another oxide colorant commonly present as an impurity in glass batch materials. Manganese oxide is known as a complementary decolorizer for iron in glass. Consequently, no color problems are encountered in the amounts otherwise permissible, that is, up to about 500 ppm iron oxide.

Other known colorants may be tolerated in amounts up to several ppm if necessary. For example, where molybdenum electrodes are used for electric melting, that element may be present in amounts up to ten ppm without apparent problem.

Electron paramagnetic resonance studies demonstrate that, quantitatively, the manganous state (MnO) tends to be so dominant that a reasonably accurate value for the manganous-manganic ratio is not obtainable. In contrast, the color effect of the manganic state is overwhelming relative to the manganous state. Hence, the manganic color prevails, providing reducing conditions that would tend to eliminate the manganic state are avoided.

Accordingly, oxidizing conditions are maintained during the glass melting process. This may be by use of oxidizing materials, such as nitrates in the batch. In addition to batch control, it is desirable to maintain an excess of oxygen in the melting furnace atmosphere. An excess on the order of 2.5 to eight percent is normally adequate.

In addition to the actual colorant, and its state of oxidation, a number of other factors must also be considered. Since the base glass is a soda lime glass, it may be necessary to temper ware to impart strength and thermal shock resistance. The thermal treatment necessary for tempering tends to shift the oxidation state of the manganese, usually from the +2 manganous form to the +3 manganic form. This intensifies the burgundy color without shifting the dominant wavelength characteristics.

Another requirement is sufficient infra-red transmission to permit heat transfer into the melt during melting. Again, the present system presents no serious problem. However, the iron oxide impurity level must be kept below about 500 ppm, and preferably no greater than about 350 ppm.

As already stated, the base glass, to which the colorant system is added, is a soda lime silica glass. This glass system is, of course, very well known in the art. In general, it consists essentially of 70–75% $SiO_2$, 5–15% $Na_2O$ and 5–15% CaO.

SPECIFIC EMBODIMENTS

The invention is further described with reference to experiments carried out in the course of its development.

A typical, water white, commercial, soda lime silicate glass was selected as a base glass. The batch for this glass was modified by adding 1.8% by weight $MnO_2$ in place of $SiO_2$. A 1500 lb., day tank melt was made in a refractory lined tank with a crown temperature of 1525° C. After a 30 hour melting time, the temperature was lowered to 1250° C. At this temperature, glass was delivered to a hydraulic press equipped to press small bowls. The pressed bowls were annealed on a 550° C. schedule.

The glass was analyzed by x-ray fluorescence and showed the following percentages by weight:

| | | | |
|---|---|---|---|
| $SiO_2$ | 73.7 | $Al_2O_3$ | 1.68 |
| $Na_2O$ | 12.65 | $Sb_2O_3$ | 0.066 |
| $K_2O$ | 0.72 | $MnO_2$ | 1.65 |
| CaO | 9.50 | $Fe_2O_3$ | 260 ppm. | x and y coordinates measured on this glass are plotted at X in FIG. 4.

A series of crucible melts was made using the same base glass, except that the $MnO_2$ substitution for $SiO_2$ was 1.4%. This glass was analyzed and showed 1.35% $MnO_2$. Its x and y coordinates are plotted at Y in FIG. 4.

A series of potential impurities was added to one of the crucible melts to determine the effect. These included 1 ppm each of $Co_3O_4$ and Se, 5 ppm each of $Cr_2O_3$ and $MoO_3$ and 20 ppm NiO. No significant shift in colors was noted from a melt with pure batch materials. This indicated that normal impurity levels can be tolerated. Subsequent studies indicated that NiO should be kept under 100 ppm to avoid introducing a brown discoloration.

Further crucible melts were made using progressively increasing levels of $MnO_2$ substitution for silica between 1.0 and 2.2%. x and y coordinates and tristimulus values were measured on the glasses thus obtained. The data obtained are plotted in FIGS. 1, 2 and 3 where chromaticity values are shown, respectively, on the vertical axes. $MnO_2$ levels, in weight percent, are shown on the horizontal axis.

Finally, several series of two-lb. (~1 kg) crucible melts were made in a controlled atmosphere furnace to determine the effect of excess oxygen in the melting atmosphere. In each series the $MnO_2$ level was again progressively increased from 1% to 2.2%. Excess oxygen levels were maintained at 1.5%, 2.8%, 4.0% and 8.0% for each $MnO_2$ level. The batches were held in the furnace for 16 hours at 1450° C., then poured as patties, cooled and inspected visually. The melts made at 2.8% and 4.0% excess oxygen appeared the same. Those made at 1.5% excess oxygen appeared lighter, and those at 8.0% appeared darker. Thus, the color intensity does increase with increasing oxygen level, but the color hue appears essentially unaffected.

In studying the effect of antimony oxide in the base glass, three comparative melts were made. Each employed a basic soda lime silicate glass as above. The calculated compositions of these glasses, together with measured chromaticity coordinates on tempered test pieces, were as follows:

|        | 1      | 2      | 3      |
|--------|--------|--------|--------|
| $SiO_2$ | 73.4 | 73.5 | 74.0 |
| $Al_2O_3$ | 1.6 | 1.6 | 1.6 |
| $K_2O$ | 0.3 | 0.3 | 0.3 |
| $Na_2O$ | 13.1 | 13.1 | 13.1 |
| CaO | 9.5 | 9.5 | 9.5 |
| $SO_3$ | 0.26 | 0.26 | 0.26 |
| $MnO_2$ | 1.4 | 1.4 | 0.7 |
| $Sb_2O_3$ | 0.07 | — | — |
| x | 0.3265 | 0.3865 | 0.3435 |
| y | 0.3180 | 0.2939 | 0.3080 |
| Cap Y | 67.3 | 15.8 | 43.0 |

Visually, Example 3 was a medium burgundy somewhat darker than Example 1. Example 2 was quite dark, and might be compared to an antimony-containing glass with somewhat over 2.2% $MnO_2$. These examples indicate that, in an antimony-free glass, a light color, such as used in a glass cover, might be obtained with 0.3 to 0.8% $MnO_2$. In turn, a darker color, such as for ovenware, might be obtained with 0.7 to 1.4% $MnO_2$.

We claim:

1. A transparent glass exhibiting a burgundy color, the glass consisting essentially of 0.3 to 2.2% by weight of manganese oxide, calculated as $MnO_2$, in a soda lime silicate base glass, exhibiting chromaticity coordinates (Illuminant C) falling within the ranges x=0.3200 to 0.3700
   y=0.3300 to 0.3080
   Cap Y=25 to 72 and having impurity levels for NiO and $Fe_2O_3$ not exceeding 100 ppm and 500 ppm, respectively.

2. A transparent glass in accordance with claim 1 wherein the $MnO_2$ content is within the range of 1.0 to 1.6% by weight, the glass contains up to 0.1% $Sb_2O_3$ as a fining agent, and the x and y chromaticity coordinates are.

x=0.3225 to 0.3400
   y=0.3295 to 0.3118.

3. A transparent glass in accordance with claim 2 wherein the x and y chromaticity coordinates fall within the rectangle ABCDA in FIG. 4 of the drawing.

4. A transparent glass in accordance with claim 1 wherein the $MnO_2$ content is within the range of 1.35 to 2.2% by weight, the glass contains up to 0.1% $Sb_2O_3$ as a fining agent, and the x and y chromaticity coordinates are.

x=0.3300 to 0.3700
   y=0.3280 to 0.3080.

5. A transparent glass in accordance with claim 4 wherein the x and y chromaticity coordinates fall within the rectangle EFGHE in FIG. 4 of the drawing.

6. A transparent glass in accordance with claim 1 wherein the $MnO_2$ content is within the range of 0.3 to 0.8% by weight and the glass is substantially free of antimony oxide.

7. A transparent glass in accordance with claim 1 wherein the $MnO_2$ content is within the range of 0.7 to 1.4% by weight and the glass is substantially free of antimony oxide.

8. A transparent glass in accordance with claim 1 wherein the NiO impurity level is not over 50 ppm.

9. A transparent glass in accordance with claim 1 wherein the manganese oxide is present as both manganic oxide and manganous oxide and the ratio of manganic oxide to manganous oxide is less than one, but the content of manganic oxide is sufficient to provide a burgundy color to the glass.

10. Tempered, transparent glassware molded from a soda lime silicate base glass containing 0.3 to 2.2% by weight manganese oxide, calculated as $MnO_2$, exhibiting chromaticity coordinates (Illuminant C) falling within the ranges x=0.3200 to 0.3700
    y=0.3300 to 0.3080
    Cap Y=25 to 72 and having impurity levels for NiO and $Fe_2O_3$ not exceeding 100 ppm and 500 ppm, respectively, whereby the glassware has a burgundy color.

11. Tempered, transparent glassware in accordance with claim 10 wherein the manganese oxide content is within the range of 1.0 to 1.6% by weight and the glass contains up to 0.1% $Sb_2O_3$ as a fining agent.

12. Tempered, transparent glassware in accordance with claim 11 wherein the x and y chromaticity coordinates of the glass fall within the rectangle ABCDA in FIG. 4 of the drawing.

13. A tempered, transparent dish in accordance with claim 10 wherein the $MnO_2$ content of the glass is within the range of 1.35 to 2.2% by weight and the glass contains up to 0.1% $Sb_2O_3$ as a fining agent.

14. Tempered, transparent glassware in accordance with claim 13 wherein the x and y chromaticity coordinates of the glass fall within the rectangle EFGHE in FIG. 4 of the drawing.

15. Tempered, transparent glassware in accordance with claim 10 wherein the $MnO_2$ content is within the range of 0.3 to 0.8% by weight and the glass is substantially free of antimony oxide.

16. Tempered, transparent glassware in accordance with claim 10 wherein the $MnO_2$ content is within the range of 0.7 to 1.4% by weight and the glass is substantially free of antimony oxide.

17. A tempered, transparent cover for a glass-ceramic cooking vessel, the cover being molded from a soda lime silicate base glass containing 1.0 to 1.6% by weight manganese oxide calculated as $MnO_2$, up to 0.1% $Sb_2O_3$ as a fining agent and having impurity levels for NiO and $Fe_2O_3$ not exceeding 100 ppm and 500 ppm, respectively, the glass exhibiting x and y chromaticity coordinates within the ranges x=0.3225 to 0.3400
    y=0.3295 to 0.3118 whereby the color of the cover is coordinated with the color of the cooking vessel.

* * * * *